United States Patent [19]

Noonan et al.

[11] 4,291,153
[45] Sep. 22, 1981

[54] WATER-DISPERSIBLE POLYESTER ADHESIVES FOR PHOTOGRAPHIC MATERIALS

[75] Inventors: John M. Noonan; Robert C. McConkey, both of Rochester, N.Y.

[73] Assignee: Eastman Kodak Company, Rochester, N.Y.

[21] Appl. No.: 174,419

[22] Filed: Aug. 1, 1980

[51] Int. Cl.³ .................. C08G 63/68; C08G 75/00
[52] U.S. Cl. .................................. 528/290; 528/172; 528/173; 528/176; 528/192; 528/293; 528/303
[58] Field of Search .............. 528/290, 293, 303, 172, 528/173, 176, 192

[56] References Cited

U.S. PATENT DOCUMENTS

| | | | |
|---|---|---|---|
| 3,546,180 | 12/1970 | Caldwell et al. | 260/76 |
| 3,929,489 | 12/1975 | Arcesi et al. | 96/115 R |
| 4,150,217 | 4/1979 | Noonan et al. | 528/290 |
| 4,150,217 | 4/1979 | Noonan et al. | 528/290 |
| 4,224,206 | 9/1980 | Sollner | 260/29.2 N |

*Primary Examiner*—Lucille M. Phynes
*Attorney, Agent, or Firm*—Arthur H. Rosenstein

[57] ABSTRACT

Disclosed herein are heat-activatable adhesive compositions containing a water-dispersible polyester which comprises A. an acid component comprising:
  (1) from about 8 to about 16 mole percent of units derived from at least one dicarboxylic acid having an ionic iminosulfonyl moiety containing a monovalent cation as an imino nitrogen substituent;
  (2) from about 40 to about 70 mole percent of units derived from at least one dicarboxylic acid selected from the group consisting of aliphatic dicarboxylic acids having the formula HOOC—(CH$_2$)$_n$—COOH wherein n is an integer from 2 to 12, cycloaliphatic dicarboxylic acids having from 6 to 12 carbon atoms, and aromatic dicarboxylic acids having from 6 to 12 carbon atoms;
  (3) from about 5 to about 20 mole percent of units derived from the dicarboxylic acid having the formula

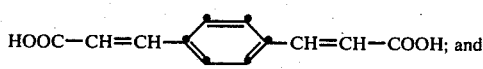

and
  (4) from about 5 to about 25 mole percent of units derived from at least one dicarboxylic acid having the formula

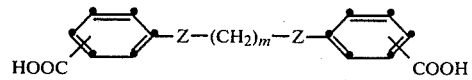

wherein Z is carbonylimino or iminocarbonyl and m is an integer from 6 to 10; and
B. a diol component consisting essentially of
  (1) at least 50 mole percent of units derived from at least one diol having a formula selected from the group consisting of:

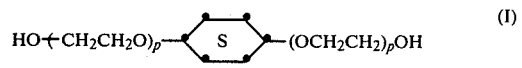

(I)

wherein p is an integer from 1 to 4, and

HO—(RO)$_q$—H (II)

wherein q is an integer from 2 to 4; and R is an alkylene group having from 2 to 4 carbon atoms; and
  (2) from 0 to 50 mole percent of units derived from at least one diol having the formula:

HO—R'—OH wherein R' is an alkylene group having up to 16 carbon atoms, cycloalkylene having from 6 to 20 carbon atoms, cycloalkylenebisalkylene having from 8 to 20 carbon atoms, or arylenebisalkylene having from 8 to 20 carbon atoms
with the proviso that said diol component (1), selected from the group consisting of (I) and (II), must comprise at least 90 mole percent of the diol component when said acid component (1), having an ionic iminosulfonyl moiety, comprises less than 10 mole percent of said acid component.

These adhesives have been found useful in a variety of photographic materials, and particularly in image transfer film units. Their adhesive strength is further characterized as being insensitive to variations in relative humidity and, after being dried, to the presence of aqueous processing compositions.

21 Claims, No Drawings

WATER-DISPERSIBLE POLYESTER ADHESIVES FOR PHOTOGRAPHIC MATERIALS

BACKGROUND OF THE INVENTION

1. Field of the Invention

This invention relates to polyester adhesive compositions and their use in laminated structures, particularly photographic elements and processes to obtain a desirable combination of properties. In particular, this invention relates to heat-activatable, water-dispersible adhesive compositions capable of bonding hydrophilic surfaces to hydrophobic surfaces in photographic materials. A preferred embodiment of this invention is the use of certain bisamide group-consisting polyester adhesives which contain an anionic iminodisulfonyl group in image transfer film units.

2. Description of the Prior Art

Arcesi et al., in U.S. Pat. No. 3,929,489 issued Dec. 30, 1975, describe water-insoluble light-sensitive polyesters comprising a diol component which may include 1,4-bis(2-hydroxyethoxy)cyclohexane; and a diacid component comprising from 2 to 45 mole percent of ionic iminodisulfonyl units, from 55 to 98 mole percent of light-sensitive crosslinkable units and up to 43 mole percent of other units derived from other diacids such as aliphatic dicarboxylic acids. These polyesters are soluble in organic and aqueous alcoholic alkaline developers, and are used in photographic elements such as lithographic printing plates and photoresists. These water-insoluble polyesters have no disclosed use as adhesives in silver halide photographic materials.

Caldwell et al., in U.S. Pat. No. 3,546,180 issued Dec. 8, 1970, describe dyeable polyesters for shaped articles such as fibers and films. These polyesters comprise a diol component which may include cyclic glycols; and a diacid component comprising from 1 to 15 mole percent of ionic iminodisulfonyl units and other diacids which may include aliphatic dicarboxylic acids. Further, the polyesters of Caldwell et al may have additional utility as adhesives when small amounts of water-insoluble crosslinked polymers are added. However, like other water-insoluble adhesives known in the art, these polyesters must coated with organic solvents. Organic solvents are substantially more costly to use than aqueous solutions. Further, the disposal of organic solvents is burdensome, since, if untreated, organic solvents can be ecologically objectionable.

Noonan, U.S. Pat. No. 4,150,217 issued Apr. 17, 1979, describes a water-soluble polyester adhesive comprising a diol component which may include 1,4-bis(2-hydroxyethoxy)cyclohexane; and a diacid component comprising from 15 to 35 mole percent of ionic iminodisulfonyl units, and from 65 to 85 mole percent of units derived from other dicarboxylic acids, which may include aliphatic dicarboxylic acids and light-sensitive ethylenically unsaturated dicarboxylic acids. However, these water-soluble polyester adhesives exhibit blocking problems when machine coated onto spool-wound materials. Further, high humidity conditions and use of an aqueous processing composition with a photographic element in an image transfer unit deleteriously affect the integrity of seals formed from the adhesive in the photographic element or image transfer film unit.

There is a need in the photographic arts for a water-dispersible, heat-activatable adhesive which can be easily and inexpensively coated from water as a stable aqueous dispersion, but which dries and coalesces to a water-insoluble adhesive film which is insensitive to humidity variations, unaffected by the presence of aqueous processing composition, and free from the blocking problems encountered with machine coatings of water-soluble polyester adhesives. Further, the dried coating when sealed, should exhibit acceptable adhesive qualities.

SUMMARY OF THE INVENTION

It has been found, according to the present invention, that certain water-dispersible polyesters are useful in adhesive compositions for photographic materials and laminated structures. These polyesters form stable dispersions in water, are coatable by machine without undesirable blocking of spool-wound materials, and dry to form a water-insoluble adhesive film which is heat-activatable to form seals insensitive to high humidity or the presence of aqueous processing composition.

One aspect of the present invention is an adhesive composition comprising

A. an acid component comprising:
   (1) from about 8 to about 16 mole percent of units derived from at least one dicarboxylic acid having an ionic iminosulfonyl moiety containing a monovalent cation as an imino nitrogen substituent;
   (2) from about 40 to about 70 mole percent of units derived from at least one dicarboxylic acid selected from the group consisting of aliphatic dicarboxylic acids having the formula $HOOC-(CH_2)_n-COOH$ wherein n is an integer from 2 to 12, cycloaliphatic dicarboxylic acids having from 6 to 12 carbon atoms, and aromatic dicarboxylic acids having from 6 to 12 carbon atoms;
   (3) from about 5 to about 20 mole percent of units derived from the dicarboxylic acid having the formula

(4) from about 5 to about 25 mole percent of units derived from at least one dicarboxylic acid having the formula

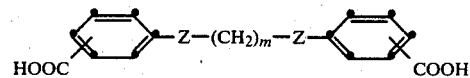

wherein Z is selected from the group consisting of carbonylimino and iminocarbonyl and m is an integer from 6 to 10; and B. a diol component consisting essentially of
   (1) at least 50 mole percent of units derived from at least one diol having a formula selected from the group consisting of:

(I)

wherein p is an integer from 1 to 4, and $HO-(RO)_q-H$ (II)

wherein q is an integer from 2 to 4; and R is an alkylene group having from 2 to 4 carbon atoms; and (2) from 0 to 50 mole percent of units derived from at least one diol having the formula:

HO—R'—OH wherein R' is an alkylene group having up to 16 carbon atoms, cycloalkylene having from 6 to 20 carbon atoms, cycloalkylenebiasalkylene having from 8 to 20 carbon atoms, or arylenebisalkylene having from 8 to 20 carbon atoms with the proviso that said diol component (1), selected from the group consisting of (I) and (II), must comprise at least 90 mole percent of the diol component when said acid component (1), having anionic iminosulfonyl moiety, comprises less than 10 mole percent of said acid component.

In another aspect of the present invention, a photographic element comprises a support having thereon at least one layer comprising an adhesive composition containing a water-dispersible polyester which includes:

A. an acid component comprising
  (1) from about 8 to about 16 mole percent of units derived from at least one dicarboxylic acid having an ionic iminosulfonyl moiety containing a monovalent cation as an imino nitrogen substituent;
  (2) from about 40 to about 70 percent of units derived from at least one dicarboxylic acid selected from the group consisting of aliphatic dicarboxylic acids having the formula HOOC—(CH$_2$)$_n$—COOH wherein n is an integer from 2 to 12, cycloaliphatic dicarboxylic acids having from 6 to 12 carbon atoms, and aromatic dicarboxylic acids having from 6 to 12 carbon atoms;
  (3) from about 5 to about 20 mole percent of units derived from the dicarboxylic acid having the formula:

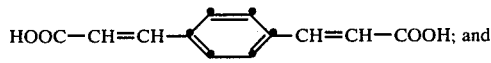

(4) from about 5 to about 25 mole percent of units derived from at least one dicarboxylic acid having the formula:

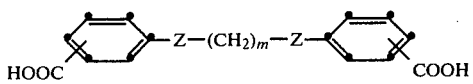

wherein Z is carbonylimino or iminocarbonyl and m is an integer from 6 to 10; and B. a diol component consisting essentially of
  (1) at least 50 mole percent of units derived from at least one diol having a formula selected from the group consisting of:

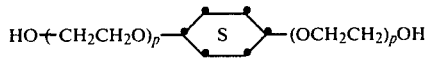     (I)

wherein p is an integer from 1 to 4, and

HO—(RO)$_q$—H     (II)

wherein q is an integer from 2 to 4; and R is an alkylene group having from 2 to 4 carbon atoms; and (2) from 0 to 50 mole percent of units derived from at least one diol having the formula:

HO—R'—OH wherein R' is an alkylene group having up to 16 carbon atoms, cycloalkylene having from 6 to 20 carbon atoms, cycloalkylenebisalkylene having from 8 to 20 carbon atoms, or arylenebisalkylene having from 8 to 20 carbon atoms with the proviso that said diol component (1), selected from the group consisting of (I) and (II), must comprise at least 90 mole percent of the diol component when said acid component (1), having an ionic iminosulfonyl moiety, comprises less than 10 mole percent of said acid component.

In a further aspect of the present invention, an image transfer film unit comprises:

a photographic element comprising a support having thereon at least one silver halide layer having associated therewith a dye or dye-forming material;

at least one layer comprising an adhesive composition comprising a water-dispersible polyester which comprises A. an acid component comprising:
  (1) from about 8 to about 16 mole percent of units derived from at least one dicarboxylic acid having an ionic iminosulfonyl moiety containing a monovalent cation as an imino nitrogen substituent;
  (2) from about 40 to about 70 mole percent of units derived from at least one dicarboxylic acid selected from the group consisting of aliphatic dicarboxylic acids having the formula HOOC—(CH$_2$)$_n$—COOH wherein n is an integer from 2 to 12, cycloaliphatic dicarboxylic acids having from 6 to 12 carbon atoms, and aromatic dicarboxylic acids having from 6 to 12 carbon atoms;
  (3) from about 5 to about 20 mole percent of units derived from the dicarboxylic acids having the formula:

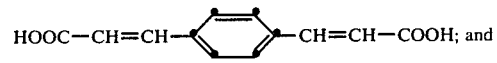

(4) from about 5 to about 25 mole percent of units derived from at least one dicarboxylic acid having the formula:

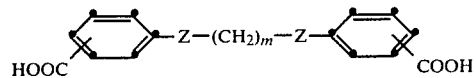

wherein Z is selected from the group consisting of carbonylimino and iminocarbonyl and m is an integer from 6 to 10; and B. a diol component consisting essentially of
  (1) at least 50 mole percent of units derived from at least one diol having a formula selected from the group consisting of:

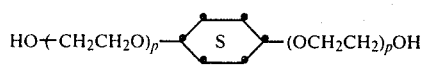

wherein p is an integer from 1 to 4, and

wherein q is an integer from 2 to 4; and R is an alkylene group having from 2 to 4 carbon atoms; and (2) from 0 to 50 mole percent of units derived from at least one diol having the formula:

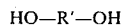

wherein R' is an alkylene group having up to 16 carbon atoms, cycloalkylene having from 6 to 20 carbon atoms, cycloalkylenebisalkylene having from 8 to 20 carbon atoms, or arylenebisalkylene having from 8 to 20 carbon atoms
with the proviso that said diol component (1), selected from the group consisting of (I) and (II), must comprise at least 90 mole percent of the diol component when said acid component (1), having an ionic iminosulfonyl moiety, comprises less than 10 mole percent of said acid component; and an image-receiving layer and means containing an alkaline processing composition adapted to discharge its contents within said unit.

In still another aspect of the present invention, a laminated structure comprises a support bonded to a layer by an adhesive composition comprising a water-dispersible polyester as described above.

In a further aspect of the present invention, a process of producing a photographic transfer image in a photographic element comprising a support having thereon at least one photosensitive silver halide emulsion layer having associated therewith a dye image-providing material, a receiving layer, a barrier layer associated with a neutralizing layer being permeable by an alkaline processing composition after a predetermined time and at least one layer comprising an adhesive composition, said process comprising:

(a) imagewise exposing said photographic element;
(b) contacting said element with alkaline processing composition in the presence of a silver halide developing agent to effect development of each of said exposed silver halide emulsion layers;
  (i) an imagewise distribution of dye image-providing material being formed as a function of development; and
  (ii) at least a portion of said imagewise distribution of said dye image providing material diffusing to said dye image-receiving layer; and
(c) neutralizing said alkaline processing composition by means of said neutralizing layer associated with said photographic element after said predetermined time; the improvement wherein said adhesive composition comprises a water-dispersible polyester as described above.

DETAILED DESCRIPTION OF THE INVENTION

The novel adhesive composition comprises a water-dispersible polyester which contains
A. an acid component comprising:
(1) from about 8 to about 16 mole percent of units derived from at least one dicarboxylic acid having an ionic iminosulfonyl moiety containing a monovalent cation as an imino nitrogen substituent;
(2) from about 40 to about 70 mole percent of units derived from at least one dicarboxylic acid selected from the group consisting of aliphatic dicarboxylic acids having the formula $HOOC-(CH_2)_n-COOH$ wherein n is an integer from 2 to 12, cycloaliphatic dicarboxylic acids having from 6 to 12 carbon atoms, and aromatic dicarboxylic acids having from 6 to 12 carbon atoms;
(3) from about 5 to about 20 mole percent of units derived from the dicarboxylic acid having the formula:

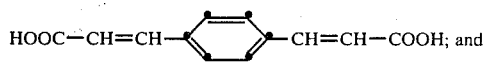

(4) from about 5 to about 25 mole percent of units derived from at least one dicarboxylic acid having the formula:

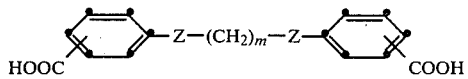

wherein Z is selected from the group consisting of carbonylimino and iminocarbonyl and m is an integer from 6 to 10; and
B. a diol component consisting essentially of
(1) at least 50 mole percent of units derived from at least one diol having a formula selected from the group consisting of:

wherein p is an integer from 1 to 4, and

wherein q is an integer from 2 to 4; and R is an alkylene group having from 2 to 4 carbon atoms; and
(2) from 0 to 50 mole percent of units derived from at least one diol having the formula:

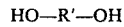

wherein R' is an alkylene group having up to 16 carbon atoms, cycloalkylene having from 6 to 20 carbon atoms, cycloalkylenebisalkylene having from 8 to 20 carbon atoms, or arylenebisalkylene having from 8 to 20 carbon atoms
with the proviso that said diol component (1), selected from the group consisting of (I) and (II), must comprise at least 90 mole percent of the diol component when said acid component (1), having an ionic iminosulfonyl moiety, comprises less than 10 mole percent of said acid component.

Generally, the water-dispersible polyesters useful in the present invention are copolyesters formed by condensing a diol component of one or more polyhydric alcohols with an acid component of at least four carboxylic acids, each containing at least two condensation sites. The carboxylic acids are condensed in the form of a free acid or in the form of a functional derivative, such as an anhydride, a lower alkyl ester or an acid halide. The diol also can be a diol per se or a functional equivalent such as a salt, or preferably, an ester of a low molecular weight acid.

From about 8 to about 16 mole percent, and preferably from about 12 to about 16 mole percent, of the acid component comprises units derived from at least one dicarboxylic acid having an iminosulfonyl moiety containing a monovalent cation as an imino nitrogen atom substituent. In a preferred embodiment of the present invention, these dicarboxylic acids have an iminosulfonyl moiety represented by the formula (I):

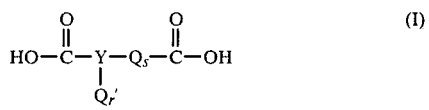

wherein r and s are integers whose sum equals 1; Q is defined by the formula (II):

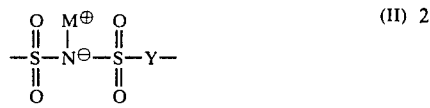

Q' is selected from the group consisting of (III) and (IV):

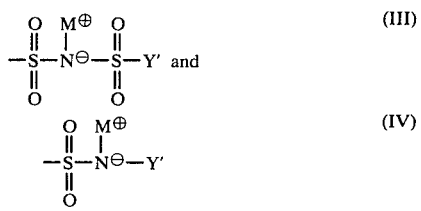

wherein Y is arylene, preferably having from 6 to 12 carbon atoms, such as phenylene, naphthylene and the like, all of which are optionally substituted with alkyl having from 1 to 4 carbon atoms, such as methyl and ethyl, halide, such as fluoride, chloride and bromide, and other substituents known to those in the art which will not interfere with the desired properties of the resulting copolyesters; Y' is substituted or unsubstituted aryl, preferably having from 6 to 12 carbon atoms, such as phenyl, naphthyl and tolyl; or substituted or unsubstituted alkyl, preferably having from 1 to 7 carbon atoms, such as methyl, ethyl, propyl and methylphenyl; and M is a solubilizing monovalent cation such as an alkali metal, ammonium cation or hydrogen. Preferably, r is 0, s is 1, Y is arylene and M is Na. Most preferably, Y is 1,3-phenylene.

Exemplary acids having an iminosulfonyl moiety include
3,3'-[(sodioimino)disulfonyl]dibenzoic acid;
3,3'-[(potassioimino)disulfonyl]dibenzoic acid;
3,3'-[(lithioimino)disulfonyl]dibenzoic acid;
4,4'-[(lithioimino)disulfonyl]dibenzoic acid;
4,4'-[(sodioimino)disulfonyl]dibenzoic acid;
4,4'-[(potassioimino)disulfonyl]dibenzoic acid;
3,4'-[(lithioimino)disulfonyl]dibenzoic acid;
3,4'-[(sodioimino)disulfonyl]dibenzoic acid;
5-[N-(4-chloronaphth-1-ylsulfonyl)-N-sodiominosulfonyl]-isophthalic acid;
4,4'-[(potassioimino)disulfonyl]dinaphthoic acid;
5-[N-(4-tolylsulfonyl)-N-potassioiminosulfonyl]-isophthalic acid;
4-[N-(p-tolylsulfonyl)-N-sodioiminosulfonyl]-1,5-maphthalene dicarboxylic acid;
5-[N-n-(hexylsulfonyl)-N-lithioiminosulfonyl]-isophthalic acid
2-[N-(phenylsulfonyl)-N-potassioiminosulfonyl]terephthalic acid
and functional derivatives thereof. These and other dicarboxylic acids are disclosed in U.S. Pat. No. 3,546,180 of Caldwell et al issued Dec. 8, 1970 and U.S. Pat. No. 3,929,489 of Arcesi et al issued Dec. 30, 1975, the disclosures of which are herein incorporated by reference.

An especially preferred iminosulfonyl compound is 3,3'-[(sodioimino)disulfonyl]dibenzoic acid or an equivalent benzoate, such as the dimethyl benzoate.

From about 40 to about 70 mole percent, and preferably from about 50 to about 60 mole percent, of the acid component comprises units derived from at least one dicarboxylic acid selected from the group consisting of aliphatic dicarboxylic acids having the formula HOOC—$(CH_2)_n$—COOH wherein n is an integer from 2 to 12, such as succinic, glutaric, adipic, pimelic, suberic, azelaic, sebacic and other higher homolog dicarboxylic acids which may be aryl- or alkyl-substituted; cycloaliphatic dicarboxylic acids having from about 6 to about 12 carbon atoms, such as 1,4-cyclohexenedicarboxylic acid, 1,4- cyclohexadienedicarboxylic acid, 1,3-cyclohexenedicarboxylic acid, and 1,3-cyclohexadienedicarboxylic acid, and aromatic dicarboxylic acids having from about 6 to about 12 carbon atoms, such as phthalic acid, isophthalic acid, terephthalic acid, and 1,4-naphthalenedicarboxylic acid.

Preferred acids according to this component include aliphatic dicarboxylic acids having the formula HOOC—$(CH_2)_n$-COOH wherein n is an integer from 2 to 12, with succinic acid (n equals 2) being most preferred.

From about 5 to about 20 mole percent, and preferably from about 15 to about 20 mole percent, of the acid component comprises units derived from the dicarboxylic acid 3,3-(1,4-phenylene(bisacrylic acid, having the formula (V):

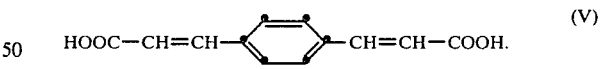

From about 5 to about 25 mole percent, and preferably from about 10 to about 20 mole percent, of the acid component comprises units derived from at least one dicarboxylic acid having the formula (VI):

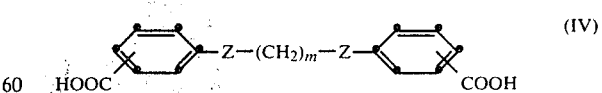

wherein Z is selected from the group consisting of carbonylimino and iminocarbonyl and m is an integer from 6 to 10, preferably 6 or 8. Most preferably, Z is carbonylimino and m is 8.

These acid components are synthesized as described by D. D. Reynolds et al, J. Org. Chem., 25, 817 (1960). A methyl ester is synthesized according to Scheme 1.

SCHEME 1

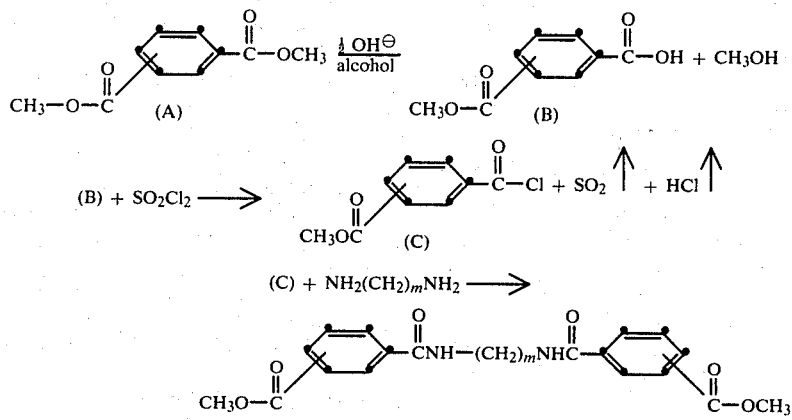

Another methyl ester is synthesized according to Scheme 2.

SCHEME 2

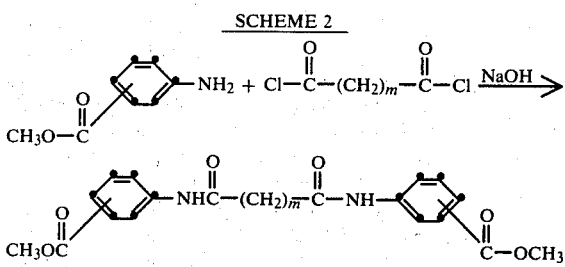

Examples of these acids include 1,6-hexylenebis-(iminocarbonyl-4-benzoic acid), 1,6-hexylenebis-(iminocarbonyl-3-benzoic acid), 1,8-octylenebis(carbonylimino-4-benzoic acid), 1,8-octylene-bis(carbonylimino)-3-benzoic acid), 1,6-hexylenebis(carbonylamino-4-benzoic acid), 1,6-henylenebis(carbonylimino-3-benzoic acid), 1,8-octylenebis(iminocarbonyl-4-benzoic acid), and 1,8-octylenebis(iminocarbonyl-3-benzoic acid). A preferred acid is 1,8-octylenebis(carbonylimino-4-benzoic acid).

The polyhydric alcohols of the polyester diol component are capable of condensing with the above-described dicarboxylic acids or functional derivatives thereof.

At least 50 mole percent, preferably 100 mole percent, of the diol component comprises units derived from at least one diol having a formula selected from the group consisting of:

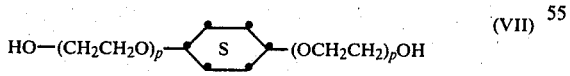 (VII)

wherein p is an integer from 1 to 4, such as 1,4-bis(2-hydroxyethoxy)cyclohexane and 1,4-bis(2-hydroxye-thoxy-ethoxy)cyclohexane; and HO-(RO)$_q$-H    (VIII)

wherein q is an integer from 2 to 4, and R is an alkylene group having from 2 to 4 carbon atoms, such as diethylene glycol, triethylene glycol, tetraethylene glycol and dipropylene glycol.

The remaining units of the diol component, if any, comprise units derived from at least one diol having the formula (IX):

HO-R'-OH wherein R' is an alkylene group having up to 16 carbon atoms, such as ethylene, trimethylene, propylene tetramethylene, 2,2-dimethyl-1,3-propylene, 1,10-decylene and 1-ethyl-1-methyl-1,3-propylene; cycloalkylene having from 6 to 20 carbon atoms, such as cyclohexylene, cycloheptylene and tetrahydronaphthylene; cycloalkylenebisalkylene having from 8 to 20 carbon atoms, such as 1,3-cyclohexylenedimethylene, and 1,4-cyclohexylenedimethylene; 1,4-cyclohexylenediethylene; or arylenebisalkylene having from 8 to 20 carbon atoms, such as 1,4-phenylenedimethylene and 1,4-phenylenediethylene. Examples of these diols useful in preparing the condensation polyesters of this invention include ethylene glycol, 1,3-propanediol, 1,4-butanediol, 1,5-pentanediol, 1,6-hexanediol, 1,7-heptanediol, 1,8-octanediol, neopentyl glycol, 2,2-diethyl-1,3-propanediol, 1,3-cyclohexane dimethanol and 1,4-cyclohexane dimethanol.

In a preferred embodiment, the diol component of the polyesters described herein consists essentially of at least 50 mole percent of units derived from at least one diol having the formula (VII) wherein p is an integer from 1 to 4, preferably 1, and 0 to 50 mole percent of units derived from at least one diol having the formula (XI) wherein R' is cycloalkylenebisalkylene having from 8 to 20 carbon atoms, R' preferably having the formula

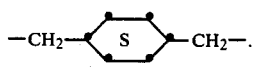

It is noted that said diol component (1), selected from the group consisting of formulae (VII) and (VIII), must comprise at least 90 mole percent of the diol component when said acid component (1), having an ionic iminosulfonyl moiety, comprises less than 10 mole percent of said acid component. In a further preferred embodiment, the diol component consists essentially of 100 mole percent of units derived from at least one diol having the formula (VII) wherein p is an integer from 1 to 4. Most preferably the diol component consists essentially of 100 mole percent of 1,4-bis(2-hydroxyethoxy)-cyclohexane.

Examples of copolyesters useful in the practice of this invention include poly[1,4-cyclohexylenebis-(oxyethylene)-co-1,4-cyclohexylenedimethylene (50:50) succinate-co-3,3'-(1,4-phenylene)bisacrylate-co-1,6-hexylenebis(iminocarbonyl-4-benzoate)-co-3,3'-sodioiminodisulfonyldibenzoate(55:20:10:15)]; poly[1,4-cyclohexylenebis(oxyethylene)succinate-co-3,3'-(1,4-phenylene)bis acrylate-co-1,6-hexylenebis(iminocarbonyl-4-benzoate)-co-3,3'-sodioiminodisulfonyldibenzoate (55:20:10:15)]; and poly[1,4-cyclohexylenebis(oxyethylene)succinate-co-3,3'-(1,4-phenylene)bisacrylate-co-1,8-octylenebis(carbonylimino-4-benzoate)-co-3,3'-sodioiminodisulfonyldibenzoate (55:20:10:15)]. A preferred copolyester is poly[1,4-cyclohexylenebis(oxyethylene)succinate-co-3,3'-(1,4-phenylene)bisacrylate-co-1,8-octylenebis(carbonylimino-4-benzoate)-co-3,3'-sodioiminodisulfonyldibenzoate (55:20:10:15)].

The condensation polyesters described herein are prepared by procedures well known in the art for making linear condensation polymers, particularly interfacial, solution or ester interchange procedures, the latter being preferred. Reaction times are a function of all other variables, and as such are governed by the inherent viscosity desired for the resulting polymer.

When employing interfacial procedures, polymerization is carried out in suitable halogenated solvents, such as methylene chloride, chloroform, dichloroethane and propylene dichloride. Reaction temperatures are governed by maintenance of a practical rate of reaction and the boiling point of the solvent with a range of 10° to 40° C. being suitable.

Solution polymerization procedures are carried out by condensing suitable acid halides, such as chlorides, of the dicarboxylates to be incorporated with the desired diols in a suitable solvent, such as terephthaloyl, isophthaloyl and hexahydrocyclohexanedicarboxylic acid chlorides in the presence of a suitable acid acceptor, such as pyridine, triethylamine and tripropylamine. The acid acceptor is optionally employed in excess to serve as the solvent.

The preferred mode of preparing the polyesters disclosed herein is the ester interchange procedure either by melt or powder process, and preferably by the melt process. The diols of the glycol component and the carboxylates of the acid component are heated to a melt on an approximately equal molar basis and treated with a transesterification catalyst such as alkali or alkaline earth metal carbonates, oxides, hydroxides, hydrides and alkoxides; or compounds of a Group IVB metal of the Periodic Table, such as tetraisopropyl orthotitanate, butyl titanate, organo-metallic halides and complex alkoxides such as $NaHTi(OC_4H_9)_2$. As a practical matter, it is frequently desirable to utilize an excess of up to about 80 molar percent of the diol component in the reaction mixture. Low boiling alcohols are removed by distillation during polymerization.

Generally, it is desirable that the condensation copolyesters described herein exhibit an inherent viscosity of from about 0.10 to about 1.0, and preferably from 0.2 to 0.6, as measured at 25° C. at a concentration of 0.25 g/deciliter in a 1:1 mixture of phenol and chlorobenzene. As used herein, the term inherent viscosity is determined by the formula $$\eta i = (2.30 \log \eta r / C)$$

wherein $\eta i$ is the inherent viscosity; $\eta r$ is the relative viscosity of a phenol:chlorobenzene solution of the polymer divided by the viscosity of the phenol:chlorobenzene mixture in the same units; and C is the concentration in grams of polymer per 100 cc of solution.

It is desirable that the polyesters described herein have a glass transition temperature within the range of about 25° C. to about 50° C., and more preferably within the range of about 28° to 47° C. Generally, this range provides optimum bonding strengths in adhesive compositions at sealing temperatures above 90° C., and preferably between about 90° C. and about 150° C. The glass transition temperatures (Tg), as used herein, unless otherwise specified, are determined by differential scanning colorimetry as disclosed in "Techniques and Methods of Polymer Evaluation," Vol. 2, Marcel Dekker, Inc., N.Y., 1970.

The polyester adhesives described herein are water-dispersible, meaning that they form discrete, dispersed, detectable particles of about 0.2 to 0.02 micron size which scatter light when mixed with water. Formation of a dispersion is visually evident from a somewhat cloudy, opalescent or iridescent appearance (Tyndall effect, as described in *Hackh's Chemical Dictionary*, 4th Edition, J. Grant, p. 698, McGraw-Hill). In contrast, water-soluble polyesters form a clear solution in water and, upon shaking, become visibly thicker, displaying an increase in viscosity. The water-dispersible polyesters of the invention, on the other hand, show no viscosity effect. A 20 percent solids dispersion of the polyester of the invention exhibits an inherent viscosity of about 0.36 in 1:1 phenol:chlorobenzene, an inherent viscosity only slightly higher than that of water but considerably lower than that of water-soluble polyesters. Preferred viscosities of the dispersions of the invention range from about 0.2 to 0.6 dL/g in 1:1 phenol:chlorobenzene.

The dispersions formed by the polyesters of the invention in water are stable. By "stable" it is meant that no agglomeration or crystallization of the dispersions is visibly detected after six months' storage of the dispersions.

The dispersibility of the polyesters of the invention possibly is due, at least in part, to three factors. It is believed that the most important of these is the presence in the acid component of the polyester of from about 5 to about 25 mole percent of units derived from at least one dicarboxylic acic having the formula

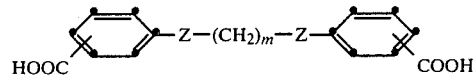

wherein Z is carbonylimino or iminocarbonyl and m is an integer from 6 to 10, as a water-insolubilizing compound.

Also possibly important to the dispersibility of the novel polyesters is the critical amount in the acid component of from about 8 to about 16 mole percent of units derived from at least one dicarboxylic acid having an ionic iminosulfonyl moiety containing a monovalent cation as an imino nitrogen substituent, and the relationship of this critical amount to the selection of diols in the diol component of the polyester. For example, if polyesters similar to those of the invention were to comprise less than 8 mole percent of the ionic dicarboxylate group, e.g. about 2 to 6 mole percent, the polyesters would be soluble in organic solvents, but not water-dispersible. If, on the other hand, polyesters similar to those of the invention were to comprise more than 16 mole percent of ionic dicarboxylate units, e.g. 20 mole percent, they would either be water-soluble or the selection of the remaining acids and diols necessary to render the polyester water-dispersible would cause a glass transition temperature too high for acceptable heat-activatable adhesivity.

Further, when the critical amount of ionic dicarboxylate units is near its lower limit of 8 mole percent of the acid component of the polyester, a larger amount, preferably 100 mole percent, of the diol component is selected from units derived from at least one diol selected from the group consisting of formulae (VII) and (VIII) to achieve a suitable dispersion.

The stable aqueous dispersions of the novel polyester are coated on an appropriate substrate and dried to produce a clear film.

The water-dispersible polyester adhesives described herein are used in a variety of photographic silver halide elements including radiographic elements, direct-positive elements, negative image-forming elements, thermally processable elements, multilayer multicolor elements, high contrast elements and the like. The resulting photographic elements are panchromatic or orthochromatic. Other typical elements and suitable photographic silver halide emulsions are disclosed in *Product Licensing Index*, Vol. 92, Dec., 1971, publication 9232, pp. 107–110, hereby incorporated by reference.

Suitable silver halide emulsions are disclosed in paragraphs I and II of *Product Licensing Index*, cited above. The silver halide emulsions can contain various addenda and vehicles as disclosed in paragraphs III–VII and XI–XVI. They are coated on various supports as described in paragraph X. The photographic layer or layers are optionally present in combination with one or more conventional subbing layers, interlayers, overcoats and the like.

The photographic elements of the present invention are prepared and processed by any convenient conventional technique. Illustrative preparation techniques are disclosed in *Product Licensing Index*, cited above, paragraphs XVII and XVIII; and exemplary processing techniques are disclosed in paragraph XXIII.

The adhesives disclosed herein are capable of being used in any layer of a photographic element wherein an adhesive is useful. One potential use is as a subbing layer to render hydrophilic proteinaceous compositions of emulsion layers adherent to hydrophobic element supports, as described in U.S. Pat. No. 3,658,541 of Jacoby et al, issued Apr. 25, 1972. Other uses are determined from general knowledge of the photographic art processed by a worker of ordinary skill in the art. Typical concentrations of the adhesives in various applications are in the range of from about 8 grams to about 24 grams per square meter of support.

A preferred embodiment of the present invention is an image transfer unit comprising:
a photographic element comprising a support having thereon at least one photographic silver halide layer having associated therewith at least one dye or dye-forming material;
at least one layer comprising an adhesive having a water-dispersible polyester described hereinabove;
an image-receiving layer; and
means containing an alkaline processing composition adapted to discharge its contents with said unit.

The image transfer film unit optionally comprises a neutralizing layer for neutralizing the alkaline processing composition; a barrier or timing layer positioned between the neutralizing layer and the silver halide layer, and a cover sheet. These units are more fully disclosed in U.S. Pat. No. 4,056,394 issued Nov. 1, 1977.

The polyester adhesives disclosed herein are capable of being used anywhere in image transfer units where there is a need to bond two layers of materials. Preferably, the adhesives are used to close the entire film unit, i.e., to bond the subbed or unsubbed support to a cover sheet during manufacture of the film unit as described in U.S. Pat. No. 4,056,394 noted hereinabove. The adhesives are also useful when bonding hydrophilic subbing layers to hydrophobic layers such as film support surfaces including poly(ethylene terephthalate), cellulose acetate butyrate and the like. However, the adhesives disclosed herein also bond strongly to metals, such as aluminum, steel, lead, tin and copper; glass, ceramics, wood and plastics known to those skilled in the photographic arts.

Still another use of these adhesives is to bond a suitable barrier or timing layer to a support material which is either the photographic element support or a cover sheet for the entire film unit.

The adhesive compositions disclosed herein are generally coated in a film in a concentration range of from about 8 grams to about 24 grams per square meter of support on one or both layers to be bonded such as a subbed support. Alternatively, the compositions are applied as a melt at temperatures ranging from 125° to 260° C.

The adhesives are desirably coated as an aqueous dispersion of from about 80 to about 140 grams adhesive per liter of dispersion at from about 35 to about 65 mil wet thickness, dried for from about 0.5 to about 1.5 minutes at from about 40° to about 100° C., and exposed for about 10 seconds to about 20 minutes to a light source such as a 200 watt high pressure mercury vapor light, xenon lamp, carbon arc and the like, before the sealing operation. The resulting adhesive coating is then sealed to various substrates at a temperature of from about 65° to about 140° C. and a pressure of from about 100 to about 1500 mm Hg.

Organic solvents are alternatively used to coat the adhesives disclosed herein. Exemplary of such chlorinated solvents are methylene chloride, methyl cellosolve, trichloroethylene and dimethylformamide. A useful concentration range is from about 1 to about 200 grams adhesive per liter of dispersion.

In one embodiment according to this invention, the image transfer film units are integral negative-receiver color diffusion transfer film units in which an adhesive composition of the invention is coated on a cover sheet.

In this embodiment, the support for the photosensitive element is transparent and is coated with the image-receiving layer, an opaque white-reflective layer, a black opaque layer and photosensitive layers having associated therewith dye image-providing materials. A rupturable container containing an alkaline processing composition and an opacifier such as carbon black is positioned adjacent the top layer and a transparent cover sheet. The cover sheet comprises a transparent support which is coated with a neutralizing layer and a timing or barrier layer. The film unit is placed in a camera, exposed through the transparent cover sheet and then passed through a pair of pressure-applying members in the camera as it is being removed therefrom. The pressure-applying members rupture the container and spread processing composition and opacifier over the image-forming portion of the film unit. The silver halide layers are developed and dye images are formed as a function of development, and dyes diffuse to the image-receiving layer to provide an image which is viewed through the transparent support on the opaque reflecting layer background. The timing layer breaks down after a period of time and makes materials to neutralize the alkaline processing composition available and to shut down further silver halide development. For further details concerning the format of this particular integral film unit, reference is made to Canadian Pat. No. 928,559.

Another embodiment of a film unit is an integral color diffusion transfer film unit in which the adhesives of the invention can be employed on the film support. In this embodiment, the photosensitive compound comprises an opaque support which is coated with an adhesive layer which is coated with photosensitive layers having associated therewith dye image-providing material layers. A rupturable container containing an alkaline processing composition, $TiO_2$ and an indicator dye (see U.S. Pat. No. 3,647,437) is positioned adjacent the top layer and a transparent receiver. The receiver comprises a transparent support which is coated with a neutralizing layer, a timing layer and an image-receiving layer. The film unit is placed in a camera, exposed through the transparent receiver and then passed through a pair of pressure-applying members in the camera as it is being removed therefrom. The pressure-applying members rupture the container and spread processing composition, $TiO_2$ and indicator dye over the image-forming portion of the film unit to protect it from exposure. The processing composition develops each silver halide layer and an imagewise distribution of diffusible dye remains in areas which are not developed, and said dye diffuses to the image-receiving layer where it can be viewed through the transparent support on a white background, the indicator dye having "shifted" to a colorless form as the alkali is consumed by the neutralizing layer. As before, the neutralizing layer then neutralizes the alkaline processing composition after the timing layer breaks down. For further details concerning the format of this particular film unit, reference is made to U.S. Pat. No. 3,415,644, which is incorporated herein by reference.

Another embodiment of a color diffusion transfer system in which the adhesives of this invention are employed in a dye image-receiving element is described in U.S. Pat. No. 3,362,819. The image-receiving element comprises a support, which can be opaque, having thereon a neutralizing layer, a timing layer and a dye image-receiving layer. For further details concerning the use of such an element in color transfer film units, reference is made to the above-mentioned U.S. Pat. No. 3,362,819, which is incorporated herein by reference.

Still other useful integral formats in which this invention can be employed are described in U.S. Pat. Nos. 3,415,645, 3,415,646, 3,647,437, 3,635,707 and 3,594,165 and Brisih Pat. No. 1,330,524.

The photographic element useful in this invention is capable of being treated with an alkaline processing composition to effect or initiate development in any manner. A preferred method for applying processing composition is by use of a rupturable container or pod which contains the composition. In general, the processing composition employed in this invention contains the developing agent for development, although the composition could also just be an alkaline solution where the developer is incorporated in the photosensitive element, in which case the alkaline solution serves to activate the incorporated developer.

The dye image-providing materials which are employed in this invention generally are characterized as either (1) initially soluble or diffusible in the processing composition but are selectively rendered nondiffusible in an imagewise pattern as a function of development, such as those disclosed, for example, in U.S. Pat. Nos. 2,647,049, 2,661,293, 2,698,244, 2,698,798, 2,802,735, 2,774,668 and 2,983,606 or (2) initially insoluble or nondiffusible in the processing composition but which provide a diffusible image dye-providing material as a function of development, such as those disclosed in U.S. Pat. Nos. 3,227,550, 3,227,551, 3,227,552, 3,227,554, 3,243,294 and 3,445,228. These materials optionally contain performed dyes or dye precursors, e.g. color couplers, oxichromic compounds and the like.

In a preferred embodiment of this invention, the dye image-providing material is a ballasted redox dye releaser. Such compounds are, generally speaking, compounds which are oxidized, i.e., crossoxidized by an oxidized developing agent, to provide a species which as a function of oxidation will release a diffusible dye, such as by alkaline hydrolysis. Such redox dye releasers are described in U.S. Pat. Nos. 3,725,062 by Anderson and Lum issued Apr. 3, 1973; 3,698,897 by Gompf and Lum issued Oct. 17, 1972; 3,628,952 by Puschel et al issued Dec. 21, 1971; 3,443,939 and 3,443,940 both by Bloom et al issued May 13, 1969 and 4,076,529 of Fleckenstein et al issued Feb. 28, 1978.

The term "nondiffusible" as used throughout the specification is intended to mean that the material will not substantially diffuse either within or from the layer in which it is located within the photographic element. In most instances, the materials are ballasted so as to render them nondiffusible. Likewise, the term "diffusible" is intended to mean that the material will substantially migrate from its layer in the photographic element in the presence of an alkali solution having a high pH such as 11 or greater to the image-receiving layer where it is mordanted.

In one preferred embodiment of this invention the redox dye releasers described in U.S. Pat. No. 4,076,529 referred to above are employed. Such compounds are nondiffusible sulfonamido compounds which are alkali-cleavable upon oxidation to release a diffusible sulfonamido dye. In certain preferred embodiments, the compounds have the formula

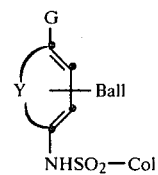

wherein:

(1) Col is a dye or dye precursor moiety;

(2) Ball is an organic ballasting group (preferably containing at least 8 carbon atoms) which renders said compound nondiffusible in a photographic element during processing of said element with an alkaline composition;

(3) Y represents the carbon atoms necessary to complete a benzene or naphthalene nucleus; and (4) G is OR or $NHR_1$ wherein R is hydrogen or hydrolyzable moiety and $R_1$ is hydrogen or a substituted or unsubstituted alkyl group of 1 to 22 carbon atoms, such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl, phenethyl, etc. (when $R_4$ is an alkyl group of greater than 6 carbon atoms, it can serve as a partial or sole Ballast group).

Sulfonamido compounds which are useful in this invention include the following:

Compound 1

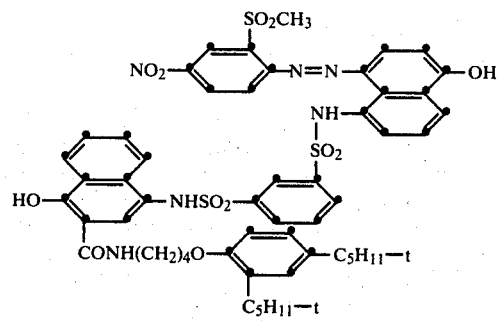

Compound 2

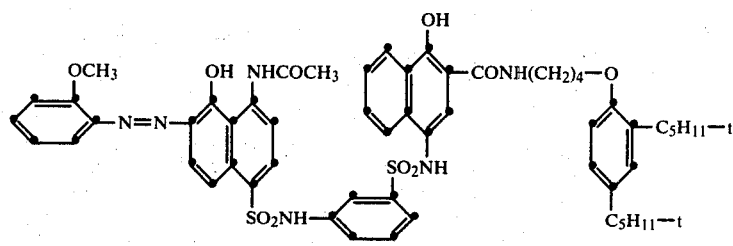

Compound 3

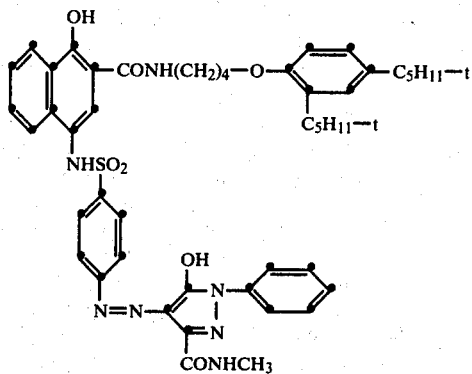

Compound 4

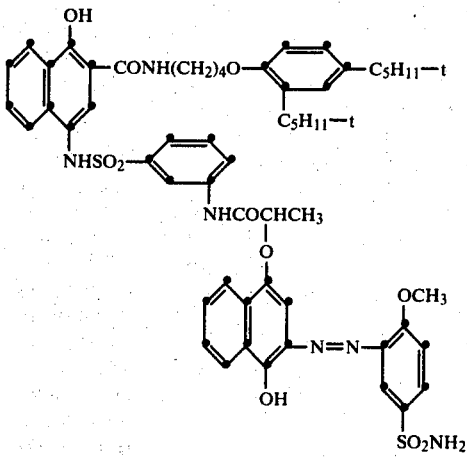

Compound 5

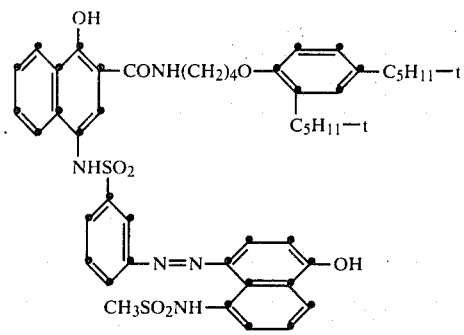

-continued

In another preferred embodiment of this invention, initially diffusible dye image-providing materials are employed such as dye developers, including metal complexed dye developers such as those described in U.S. Pat. Nos. 3,453,107, 3,544,545, 3,551,406, 3,563,739, 3,597,200 and 3,705,184, and oxichromic developers as described and claimed in U.S. Pat. No. 3,880,658 by Lestina and Bush issued Apr. 29, 1975, the diclosures of which are hereby incorporated by reference. When oxichromic developers are employed, the image is formed by the diffusion of the oxichromic developer to the dye image-receiving layer where it undergoes chromogenic oxidation to form an image dye.

The film unit of the present invention is useful to produce positive images in single or multicolors, as well as in black and white. In a three-color system, each silver halide emulsion layer of the film assembly has associated therewith a dye image-providing material capable of providing a dye having a predominant spectral absorption within the region of the visible spectrum to which said silver halide emulsion is sensitive, i.e. the blue-sensitive silver halide emulsion layer has a yellow dye image-providing material associated therewith, the green-sensitive silver halide emulsion layer has a magenta dye image-providing material associated therewith and the red-sensitive silver halide emulsion layer has a cyan dye image-providing material associated therewith. The dye image-providing material associated with each silver halide emulsion layer is contained either in the silver halide emulsion layer itself or in a layer contiguous the silver halide emulsion layer.

The concentration of the dye image-providing materials is capable of being varied over a wide range, depending upon the particular compound employed and the results which are desired. For example, in one embodiment the dye image-providing compounds are coated as dispersions in layers by using coating compositions containing a weight ratio between about 0.25 and about 4 of the dye image-providing compound to the hydrophilic film-forming natural material or synthetic polymer binder, such as gelatin and polyvinyl alcohol, which is adapted to be permeated by an aqueous alkaline processing composition.

Generally, most silver halide developing agents are useful to develop the silver halide emulsions in the photographic elements. In one embodiment, the developer is employed in the photosensitive element to be activated by the alkaline processing composition. Specific examples of developers which can be employed in this invention include
hydroquinone
N-methylaminophenol
Phenidone (1-phenyl-3-pyrazolidinone)
Dimezone (1-phenyl-4,4-dimethyl-3-pyrazolidinone)
aminophenols
N,N-diethyl p-phenylenediamine
3-methyl-N,N-diethyl-p-phenylenediamine
N,N,N',N'-tetramethyl-p-phenylenediamine
4-hydroxymethyl-4-methyl-1-phenyl-3-pyrazolidinone
etc.

In using redox dye releaser compounds in this invention, the diffusible dye image is produced as a function of development of the silver halide emulsions. If the silver halide emulsion employed forms a direct-positive silver image, such as a direct-reversal internal-image emulsion or a solarizing emulsion, which is developable in unexposed areas, a positive image is obtained on the dye image-receiving layer when redox releasers are employed which release dye where oxidized. After exposure of the film unit, the alkaline processing composition permeates the various layers to initiate development in the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the redox dye releaser compound, the oxidized form of which either releases directly or undergoes a base-catalyzed reaction to release the performed dyes or the dye precursors imagewise as a function of the imagewise exposure of each of the silver halide emulsion layers. At least a portion of the imagewise distributions of diffusible dyes or dye precursors diffuse to the image-receiving layer to form a positive image of the original subject.

Internal-image silver halide emulsions useful in the above-described embodiment are direct-positive emulsions that form latent images predominantly inside the silver halide grains, as distinguished from silver halide grains that form latent images predominantly on the surface thereof. Such internal-image emulsions were described by Davey et al in U.S. Pat. No. 2,592,250 issued Apr. 8, 1952 and elsewhere in the literature. Other useful emulsions are described in U.S. Pat. Nos. 3,761,276, 3,761,266 and 3,761,267, all issued Sept. 25, 1973. Internal-image silver halide emulsions are defined in terms of the increased maximum density obtained when developed to a negative silver image with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 second, and developing for 3 minutes at 20° C. in Developer A below ("internal-type" developer), have a maximum density at least 5 times the maximum density obtained when an equally exposed silver halide emulsion is developed for 4 minutes at 20° C. in Developer B described below ("surface-type" developer). Preferably, the maximum density in Developer A is at least 0.5 density unit greater than the maximum density in Developer B.

| Developer A | |
|---|---|
| hydroquinone | 15 g |
| monomethyl-p-aminophenol sulfate | 15 g |
| sodium sulfite (desiccated) | 50 g |
| potassium bromide | 10 g |
| sodium hydroxide | 25 g |
| sodium thiosulfate | 20 g |
| water to make 1 liter | |

| Developer B | |
|---|---|
| p-hydroxyphenylglycine | 10 g |
| sodium carbonate | 100 g |
| water to make 1 liter | |

The internal-image silver halide emulsions when processed in the presence of fogging or nucleating agents provide direct-positive silver images. Such emulsions are particularly useful in the above-described embodiment. Suitable fogging agents include the hydrazines disclosed in U.S. Pat. Nos. 2,588,982 by Ives issued Mar. 11, 1952 and 2,563,785 issued Aug. 7, 1951; the hydrazides and hydrazones disclosed by Whitmore, U.S. Pat. Nos. 3,227,552 issued Jan. 4, 1966; hydrazone quaternary salts described in British Pat. No. 1,283,835 and U.S. Pat. No. 3,615,615; hydrazone-containing polymethine dyes described in U.S. Pat. No. 3,718,470 and fogging agents or mixtures thereof. The quantity of fogging agent employed is capable of being widely varied depending upon the results desired. Generally, the concentration of fogging agent is from about 0.4 to about 8 g/mole of silver in the photosensitive layer in the photosensitive element or from about 0.1 to about 2 g/liter of developer if it is located in the developer. The fogging agents described in U.S. Pat. Nos. 3,615,615 and 3,718,470, however, are preferably used in concentrations of 50 to 400 mg/mole of silver in the photosensiive layer.

Useful direct-positive emulsions are disclosed in U.S. Pat. Nos. 3,227,552 by Whitmore issued Jan. 4, 1966; 3,761,276 by Evans issued Sept. 25, 1973; 3,761,267 by Gilman et al, 3,761,266 by Milton and 3,703,584 by Motter.

In other embodiments, the direct-positive emulsions are emulsions which have been fogged either chemically or by radiation on the surface of the silver halide grains to provide for development to maximum density without exposure. Upon exposure, the exposed areas do not develop, thus providing for image discrimination and a positive image. Silver halide emulsions of this type are very well known in the art and are disclosed, for example, in U.S. Pat. Nos. 3,367,778 by Berriman issued Feb. 6, 1968; 3,501,305; 3,501,306 and 3,501,307 by Illingsworth, all issued Mar. 17, 1970.

In still other embodiments, the direct-positive emulsions are of the type described by Mees and James, *The Theory of the Photographic Process*, published by MacMillan Company, New York, N.Y., 1966, pp. 149–167.

In one embodiment, the various silver halide emulsion layers of a color film assembly of the invention are disposed in the usual order, i.e. the blue-sensitive silver halide emulsion layer first with respect to the exposure side, followed by the green-sensitive and red-sensitive silver halide emulsion layers. If desired, a yellow dye layer or a yellow colloidal silver layer is present between the blue-sensitive and green-sensitive silver halide emulsion layer for absorbing or filtering blue radiation that is transmitted through the blue-sensitive layer. If desired, the selectively sensitized silver halide emulsion layers are alternatively disposed in a different order, e.g., the blue-sensitive layer first with respect to the exposure side, followed by the red-sensitive and green-sensitive layers.

The rupturable container employed in this invention is of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color photographic film unit according to this invention, each silver halide emulsion layer containing a dye image-providing material or having the dye image-providing material present in a contiguous layer optionally is separated from the other silver halide emulsion layers in the negative portion of the film unit by materials including gelatin, calcium alginate, or any of the layers disclosed in U.S. Pat. No. 3,384,483, polymeric materials such as polyvinylamides as disclosed in U.S. Pat. No. 3,421,892, or any of those layers disclosed in French Patent 2,028,236 or U.S. Pat. Nos. 2,992,104; 3,043,692; 3,044,873; 3,061,428; 3,069,263; 3,069,264; 3,121,011 and 3,427,158.

Generally, except where noted otherwise, the silver halide emulsion layers in the invention comprise photosensitive silver halide dispersed in gelatin and are about 0.25 to 5 microns in thickness; the dye image-providing materials are dispersed in an aqueous alkaline solution-permeable polymeric binder, such as gelatin, as a separate layer about 0.25 to 5 microns in thickness; and the alkaline solution-permeable polymeric interlayers, e.g. gelatin, are about 0.25 to 5 microns in thickness. These thicknesses are approximate only and are capable of being modified according to the product desired.

The alkaline solution-permeable, light-reflective layer employed in certain embodiments of photographic film units of this invention generally comprises any opacifier dispersed in a binder as long as it has the desired properties. Particularly desirable are white light-reflective layers since they are esthetically pleasing backgrounds on which to view a transferred dye image and also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica or mixtures thereof in widely varying amounts depending upon the degree of opacity desired. The opacifying agents are dispersed in any binder such as an alkaline solution-permeable polymeric matrix, such as, for example, gelatin, poly(vinyl alcohol) and the like. Brightening agents such as the stilbenes, coumarins, triazines and oxazoles are optionally added to the light-reflective layer. When it is desired to increase the opacifying capacity of the light-reflective layers, dark-colored opacifying agents, (e.g., pH-indicator dyes) are added, or carbon black, nigrosine dyes, etc., are coated in a separate layer adjacent the light-reflective layer.

The neutralizing layer employed in this invention which becomes operative after permeation of the processing composition through the timing layer effects a reduction in the pH of the image layers from about 13 or 14 to at least 11 and preferably 5–8 within a short time after imbibition. For example, polymeric acids as disclosed in U.S. Pat. No. 3,362,819 or solid acids or metallic salts, e.g. zinc acetate, zinc sulfate, magnesium acetate, etc., as disclosed in U.S. Pat. No. 2,584,030 are employed with good results. Such neutralizing or pH-lowering materials reduce the pH of the film unit after development to terminate development and substantially reduce further dye transfer and thus stabilize the dye image.

Any material is capable of being employed as the image-receiving layer in this invention as long as the desired function of mordanting or otherwise fixing the dye images is obtained. The particular material chosen depends upon the dye to be mordanted. If acid dyes are to be mordanted, the image-receiving layer contains basic polymeric mordants such as polymers of aminoguanidine derivatives of vinyl methyl ketone such as described by Minsk, U.S. Pat. No. 2,882,156 issued Apr. 14, 1969 and basic polymeric mordants such as described in U.S. Pat. Nos. 3,709,690; 3,625,694 and 3,898,088 of Cohen issued Aug. 5, 1975 and 3,859,096 of Burness et al issued Jan. 7, 1975. Other mordants useful in this invention include poly-(4-vinylpyridine) and similar compounds described by Sprague et al, U.S. Pat. No. 2,484,430 issued Oct. 11, 1949 and cetyl trimethyl-ammonium bromide, etc. Effective mordanting compositions are also described in U.S. Pat. Nos. 3,271,148 by Whitmore; 3,271,147 by Bush, both issued Sept. 6, 1966; and 3,958,995 of Campbell et al.

Other materials useful in the dye image-receiving layer include alkaline solution-permeable polymeric layers such as N-methoxymethyl polyhexamethylene adipamide, partially hydrolyzed poly(vinyl acetate) and other materials of a similar nature. Generally, good results are obtained when the image-receiving layer, preferably alkaline solution-permeable, is transparent and about 2.5 to about 5µ in thickness.

The alkaline processing composition employed in this invention is the conventional aqueous solution of an alkaline material, e.g. sodium hydroxide, sodium carbonate or an amine such as diethylamine, preferably processing at a pH in excess of 11, and preferably containing a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cps. to about 200,000 cps. In certain embodiments of this invention, an opacifying agent, e.g. TiO$_2$, carbon black, indicator dyes, etc. are added to the processing composition. In addition, ballasted indicator eyes and dye precursors are also useful in the photographic film unit as a separate layer on the exposure side of the photosensitive layers, the indicator dyes being preferably transparent during exposure and becoming colored or opaque after contact with alkali from the processing composition.

The support for the photographic elements of this invention is capable of being any material as long as it does not deleteriously effect the photographic properties of the film unit and is dimensionally stable. Examples of flexible sheet materials include cellulose intrate film, cellulose acetate film, poly(vinyl acetal) film, polystyrene film, poly(ethylene terephthalate) film, polycarbonate film, poly-α-olefins such as polyethylene and polypropylene film, and related films or resinous materials. The support is preferably about 2 to 9 mils (50–225µ) in thickness. Ultraviolet-absorbing materials are included in the supports or as a separate layer on the supports if desired.

The silver halide emulsions useful in this invention are well known to those skilled in the art and are described in *Product Licensing Index,* Vol. 92, Dec., 1971, publication 9232, p. 107.

The properties of the adhesive compositions used to bond the film unit are particularly important, i.e., they must have an extremely good shelf life at about 25° C. and 40–60% relative humidity, be non-blocking as tested by ASTM D1146 at 38° C. and be non-photoactive and produce seals of consistent quality. The particular polyester adhesives of this invention satisfy all of these critical requirements.

In another embodiment of the present invention, the adhesive compositions described herein are useful in laminated structures which are useful in a variety of applications including photographic cover sheets, sound recording tape, plastic glazing material, protective coatings, etc.

Laminated structures comprise a support or base material which can be woven fabrics of natural and/or synthetic fibers; fibrous non-woven structures such as paper and cardboards; metal sheets such as aluminum and steel; blockplate such as tinplate or steel; leather; wood, particularly plywood or composition board; polymers such as poly(ethylene terephthalate), polyethylene, poly(vinyl chloride) and poly(vinylidene chloride); rubber and synthetic rubber, cellular structures such as cellular polystyrene and cellular cellulose acetate; woven and non-woven sheets of glass fibers; masonry structures such as cement or cinder blocks and glass. Preferred supports include polystyrene, cellulose acetate and poly(ethylene tetephthalate).

The adhesive compositions disclosed herein are coated as aqueous dispersions on supports in a concentration of from about 8 grams to about 24 grams per square meter of support, bonding it to a suitable layer which is the same or different as the support material. Preferably, the adhesives are used to bond hydrophilic support materials to hydrophobic layers, such as poly(ethylene terephthalate) to cellulose acetate butyrate.

Polyester adhesive layers in the laminated structure of the present invention are applied to either laminate from water or suitable organic solvents, as disclosed hereinabove, by spraying, brushing, dipping or other coating techniques. The solvent is preferably removed from the adhesive layer by drying so that this layer is in the form of a substantially homogeneous coating upon one or the other or both of the laminates to be laminated together. Lamination is carried out conveniently in the conventional manner by applying heat and pressure to the composite structure, thereby softening the adhesive layer and producing a strong bond between the laminates. An alternative procedure involves using preformed homegeneous thin films upon a surface from which they may be readily stripped, the cast films being poured from organic solvent solutions, aqueous dispersions or from hot melts of the adhesive. After formation and solidification of the polyester adhesive layer in the form of thin films, these films are interpersed between as many layers as desired to form a composite which is laminated together by application of heat and pressure.

In a preferred embodiment a film unit comprising:

a photographic element comprising a support having thereon at least one photographic silver halide layer and an image-receiving layer;

a masking element having therein an aperture to define the image area of the photographic element;

an elongated side rail element disposed along and parallel with at least two sides of the masking element;

means containing an alkaline processing composition adapted to discharge its contents with said film unit; and a cover sheet comprising a support having thereon an innermost neutralizing layer for neutralizing said alkaline processing composition, and an outermost barrier layer which is permeable to said alkaline processing composition after a predetermined time;

is sealed by the method comprising the steps of:

(a) coating an aqueous dispersion of the adhesive composition of the invention on at least one surface selected from the group consisting of the timing layer surface of said cover sheet, a first surface of said side rail element adjacent to and opposing said timing layer surface of said cover sheet, a second surface of said side rail element adjacent to and opposing said masking element and a surface of said masking element adjacent to and opposing said second surface of said side rail element;

(b) drying the dispersion of step (a);

(c) forming a sandwich of said masking element, said side rail element and said cover sheet; and (d) contacting both sides of said sandwich simultaneously with a sealing element heated to a predetermined temperature and with a predetermined compressive force.

In a particularly preferred embodiment the predetermined temperature of step (d) is 149° C.

The following examples further illustrate the invention.

EXAMPLE 1

Poly[1,4-cyclohexylenebis(oxyethylene) succinate-co-3,3'-(1,4-phenylene)bis-acrylate-co-1,8-octylene-bis(carbonylimino-4-benzoate)-co-3,3'-sodioiminodisulfonyl-dibenzoate(55:20:10:15)]

A mixture of dimethyl 3,3'-sodioiminodisulfonyldibenzoate, diethyl succinate, diethyl 3,3'-(1,4-phenylene)bisacrylate, dimethyl 1,8-octylenebis(carbonylimino-4-benzoate) and 1,4-bis(2-hydroxyethoxy)-cyclohexane in amounts proportional to the molar ratios indicated above, with 72 mole percent excess of the diol component, was placed in a polymerization flask. The flask was capped with a Vigreux condenser, flushed with nitrogen at 40 ml/min and immersed in a 235° C. salt bath. When a homogeneous melt was obtained, one drop of tetraisopropylorthotitanate was added as a catalyst. The volatile alcohols were distilled at 235° C. at atmospheric pressure for 4 hours and the melt was then stirred at 200 rpm under a vacuum drawn to about 0.05 mm Hg. When the measured torque applied by the melt to the stirrer was sufficiently high to indicate sufficient polymerization, the stirring and vacuum were discontinued and the polymerization flask removed from the bath as quickly as possible. The polymerization flask was immersed in liquid nitrogen and the flask was broken away from the cold solidified glassy polyester. The inherent viscosity of the polyester at 25° C. was 0.40 and the glass transition temperature was 47° C.

EXAMPLES 2 and 3

Polyester Adhesives

Table I identifies the materials used to prepare the adhesives of Examples 2 and 3, listed in Table II by a procedure similar to that used in Example 1.

TABLE I

| | Explanation of Monomer Code |
|---|---|
| A | 1,4-Bis(2-hydroxyethoxy)cyclohexane |
| B | 1,4-Cyclohexane Dimethanol |
| C | Diethyl Succinate |
| D | Diethyl 3,3'-(1,4-phenylene)bisacrylate |
| E | Dimethyl 1,6-hexylenebis(iminocarbonyl-4-benzoate) |
| F | Dimethyl 3,3'-sodioiminodisulfonyldibenzoate |

TABLE II

| Example | Diol(s)/Mole % | Carboxylates/Mole % | Inherent Viscosity | Tg °C. |
|---|---|---|---|---|
| 2 | A/100 | C/55 D/20 E/10 F/15 | 0.47 | 28 |
| 3 | A/50 B/50 | C/55 D/20 E/10 F/15 | 0.42 | 49 |

EXAMPLE 4

Adhesive Strengths of the Polyesters

A homogeneous dispersion of 5 grams of the polyester adhesive used in 25 ml of water was coated on 2.5 or 4 mil poly(ethylene terephthalate) subbed with a latex copoly(acrylonitrille-co-vinyldiene) chloride-co-acrylic acid) (15:79:6) at a wet coating thickness of 4 mils. The resulting coating was dried for 2 hours at 85° C., and heat sealed at 90° C. under roller pressure to the timing layer side of a cover sheet having a "double" barrier timing layer as described in U.S. Pat. No. 4,061,491 of Hannie et al.

EQUIPMENT

The peel equipment consisted of a cylindrical test drum mounted on 4 Teflon nesting rollers. The drum was made of ceramic or metal and was surfaced with a sheet of poly(ethylene terephthalate) coated with a neutralizing layer and a timing layer generally used as cover sheet material. Timing layer outward, the surfaced drum rotated freely on the rollers and was heated with an axially positioned 2000 watt, General Electric 2M/T3/1CL 230-250 v, quartz infrared lamp. This equipment was mounted on the moving crosshead of an Instron Tensile Testing Machine. The surface temperature of the drum was controlled by several means including a Cole-Parmer thermistor probe and a YSI Model 72 Proportional Temperature Controller. The temperature of the surface was measured by a thermocouple and was displayed by a Data Technology Corporation Millivolt Meter.

Peel Strips

The test strips which were peeled from the drum consisted of an adhesive coated on sheets of poly(ethylene terephalate). The coatings were 0.5 mil or 1 mil thick. A strip ½ inch wide and about 12 inches long was cut from the sample after drying or cooling.

Peel Experiment

In preparation for a peel experiment the drum was heated to the desired temperature and a test strip was wrapped circumferentially around it with the adhesive side down on the drum. A mechanically actuated, heated 1.5 Kg bonding roller was passed at 1"/min. (2.54 cm/min.) over the test strip to achieve a defect-free bond of the adhesive to the drum.

One end of the test strip was then attached to the Instron load cell and the temperature was adjusted to the desired point. The test was carried out by traversing the crosshead of the Instron downwards, at the desired rate, for a distance of about 1 inch (2.54 cm). The drum rotated as the test strip was peeled from it so that the peel angle remained constant at 90°.

The force required to peel the strip from the drum was recorded by a strip chart recorder which ran at 10 inches (25.4 cm) per minute. Thus, on completing a measurement at one temperature, a recording of force in grams vs. time was obtained. Rates of 12"/min. (30.5 cm/min.) and 0.1"/min. (0.254 cm/min.) at temperatures of 5° C., 10° C., 25° C., 50° C. and 70° C. were used.

Results are recorded in the following Table III.

Control D', containing an amount of ionic iminodisulfonyl monomer within the critical range of 8 to 16 mole percent but lacking the critical bisesteramide, formed a stable dispersion in water and showed good adhesive strength at low temperatures. However, dried films soaked for 2 hours in distilled water exhibited sufficient swelling to enable delamination from the support, and seals formed by the adhesive delaminated at higher temperatures of 50° C. and 70° C. Thus the water resistance and adhesive qualities of the polyester were not acceptable.

In comparison, Example 3 of the invention contains both the critical bisesteramide E and an amount of ionic iminodisulfonyl monomers within the critical range of 8 to 16 mole percent, according to the following formula:

A(50) B(50) C(55) D(20) E(10) F(15). The polyester of Example 3 formed a stable dispersion, formed a nontacky film after coating and drying, exhibited only negligible swelling after soaking in distilled water for 2 hours and exhibited good adhesive strength with no delamination of seals formed by the adhesive at higher temperatures. It is thus seen that both the presence of a biesteramide, such as E, and the confining of the amount of ionic iminodisulfonyl monomer to the critical amount of 8 to 16 mole percent, are necessary to produce a polyester which forms stable aqueous dispersions and simultaneously maintains acceptable adhesivity.

TABLE III

| Example | Rate/Temp. | Adhesive Strength of the Polyesters Peel Force in g/in | | | | | | |
|---|---|---|---|---|---|---|---|---|
| | | 5° C. | 10° C. | 15° C. | 25° C. | 35° C. | 50° C. | 70° C. |
| 1 | 0.1"/min | >1520C | >1960C | >2120C | >1440C | >2810C | >2000C | >3050C |
| | 12"/min | >610C | >600C | >880C | >1920C | >2040C | >1500C | >2520C |
| 2 | 0.1"/min | >950C | >3700C | >1160C | >1230C | >3120C | >2530C | >2000C |
| | 12"/min | >650C | >970C | >1020C | >1440C | >1600C | >1800C | >2720C |
| 3 | 0.1"/min | >1900C | >2120C | >3260C | >3120C | >3460C | >2020C | >2640C |
| | 12"/min | >500C | >1100C | >1040C | >1520C | >1380C | >1440C | >1340C |

EXAMPLE 5

Comparison of Polyesters Outside the Invention with a Polyester of the Invention The following control polyester adhesives of Table IV were prepared using procedures similar to the method of Example 1.

TABLE IV

| Control | Diols/Mole % | Carboxylates/Mole 5 | Tg | [N] |
|---|---|---|---|---|
| A' | A/50 B/50 | C/60 D/20 E/0 F/20 | 41° C. | 0.38 |
| B' | A/50 B/50 | C/50 D/20 E/10 F/20 | 63° C. | 0.42 |
| C' | A/50 B/50 | C/40 D/20 E/20 F/20 | 73° C. | 0.41 |
| D' | A/50 B/50 | C/65 D/20 E/0 F/15 | 25° C. | 0.43 |

Control A' is similar to the polyesters of the invention but lacks the bisesteramide E and contains more than the critical amount of the ionic iminodisulfonyl monomer F. While Control A', when coated, formed a nontacky film which exhibited no blocking problems and extremely high adhesive strength, the polyester slowly dissolved in water. Thus, Control A' was not water-dispersible as required by the invention.

Controls B' and C', containing 10 and 20 mole percent of the critical bisesteramide respectively, but still containing more than the critical amount of the ionic iminodisulfonyl monomer, formed very stable dispersions. However, under the standard sealing conditions, adhesive bonds could not be made.

The invention has been described in detail with particular reference to preferred embodiments thereof, but it will be understood that variations and modifications can be effected within the spirit and scope of the invention.

What is claimed is:

1. An adhesive composition comprising a water-dispersible polyester which comprises
   A. an acid component comprising:
      (1) from about 8 to about 16 mole percent of units derived from at least one dicarboxylic acid having an ionic iminosulfonyl moiety containing a monovalent cation as an imino nitrogen substituent;
      (2) from about 40 to about 70 mole percent of units derived from at least one dicarboxylic acid selected from the group consisting of aliphatic dicarboxylic acids having the formula HOOC—$(CH_2)_n$—COOH wherein n is an integer from 2 to 12, cycloaliphatic dicarboxylic acids having from 6 to 22 carbon atoms and aromatic dicarboxylic acids having from 6 to 12 carbon atoms;
      (3) from about 5 to about 20 mole percent of units derived from a dicarboxylic acid having the formula:

(4) from about 5 to about 25 mole percent of units derived from at least one dicarboxylic acid having the formula:

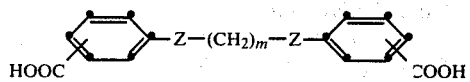

wherein Z is selected from the group consisting of carbonylimino and iminocarbonyl and m is an integer from 6 to 10; and B. a diol component consisting essentially of:
(1) at least 50 mole percent of units derived from at least one diol having a formula selected from the group consisting of:

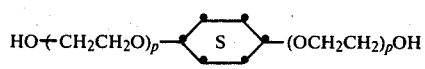  (I)

wherein p is an integer from 1 to 4, and

HO—(RO)$_q$—H  (II)

wherein q is an integer from 2 to 4 and R is alkylene having from 2 to 4 carbon atoms; and
(2) from 0 to 50 mole percent of units derived from at least one diol having the formula

HO—R'—OH wherein R' is an alkylene group having up to 16 carbon atoms, cycloalkylene having from 6 to 20 carbon atoms, cycloalkylenebisalkylene having from 8 to 20 carbon atoms, or arylenebisalkylene having from 8 to 20 carbon atoms,
with the proviso that said diol component (1), selected from the group consisting of (I) and (II), must comprise at least 90 mole percent of the diol component when said acid component (1), having an ionic iminosulfonyl moiety, comprises less than 10 mole percent of said acid component.

2. The adhesive composition of claim 1 wherein the polyester has a glass transition temperature within the range of from about 25° C. to about 50° C.

3. The adhesive composition of claim 1 wherein the polyester has an inherent viscosity within the range of 0.1 to 1.0 at 25° C. in a 1:1 mixture of phenol and chlorobenzene at a concentration of 0.25 g/dl.

4. The adhesive composition of claim 1 wherein said acid component (1), having an ionic iminosulfonyl moiety, has the formula:

HOOC—Y—Q$_s$—COOH
          |
          Q$_r$' wherein:
r and s are integers whose sum equals 1;
Q is defined by the formula

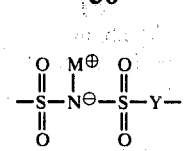

wherein
Y is arylene;
Q' is selected from the group consisting of:

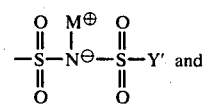 and

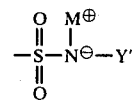

wherein Y' is alkyl or aryl and M is a solubilizing cation.

5. The adhesive composition of claim 4 wherein r is 0, s is 1, Y is arylene and M is Na.

6. The adhesive composition of claim 5 wherein Y is 1,3-phenylene.

7. The adhesive composition of claim 1 wherein said acid component (2) has the formula HO—(CH$_2$)n—COOH wherein n is an integer from 2 to 12.

8. The adhesive composition of claim 7 wherein n is 2.

9. The adhesive composition of claim 1 wherein said acid component (4) has the formula

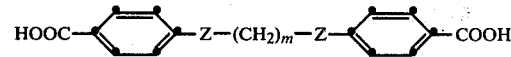

wherein Z is carbonylimino or iminocarbonyl and m is an integer of 6 to 8.

10. The adhesive composition of claim 9 wherein m is 8.

11. The adhesive composition of claim 1 wherein said diol component consists essentially of:
(1) at least 50 mole percent of units derived from at least one diol having the formula:

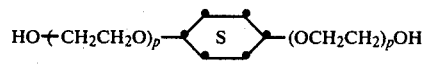

wherein p is an integer from 1 to 4; and
(2) from 0 to 50 mole percent of units derived from at least one diol having the formula HO—R'—OH wherein R' is cycloalkylenebisalkylene having from 8 to 20 carbon atoms.

12. The adhesive composition of claim 11 wherein said diol component comprises at least 50 mole percent of 1,4-bis(2-hydroxyethoxy)cyclohexane.

13. An adhesive composition comprising a water-dispersible polyester having a glass transition temperature within the range of from about 25° C. to about 50° C., the polyester comprising
A. an acid component comprising:

(1) from about 8 to about 16 mole percent of units derived from at least one dicarboxylic acid having the formula

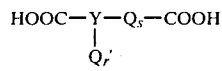

wherein r and s are integers whose sum equals 1; Q is defined by the formula

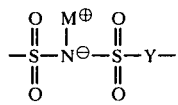

wherein Y is arylene, Q' is selected from the group consisting of:

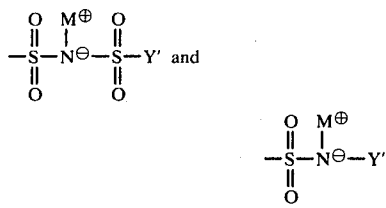

wherein Y' is alkyl or aryl, and M is a solubilizing cation;
(2) from about 40 to about 70 mole percent of units derived from at least one dicarboxylic acid having the formula HOOC—(CH$_2$)$_n$—COOH, wherein n is an integer from 2 to 12;
(3) from about 5 to about 20 mole percent of units derived from the dicarboxylic acid having the formula

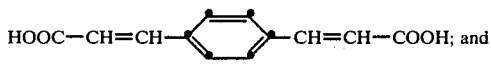

(4) from about 5 to about 25 mole percent of units derived from at least one dicarboxylic acid having the formula

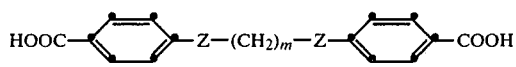

wherein Z is selected from the group consisting of carbonylimino and iminocarbonyl and m is an integer from 6 to 10; and
B. a diol component consisting essentially of:
(1) at least 50 mole percent of units derived from at least one diol having the formula

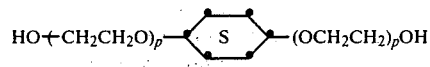

wherein p is an integer from 1 to 4; and
(2) from 0 to 50 mole percent of units derived from at least one diol having the formula

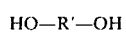

wherein R' is cycloalkylenebisalkylene having from 8 to 20 carbon atoms,
with the proviso that said diol component (1) must comprise at least 90 mole percent of the diol component when said acid component (1) comprises less than 10 mole percent of said acid component.
14. The adhesive composition of claim 13 wherein the polyester has an inherent viscosity within the range of 0.1 to 1.0 at 25° C. in a 1:1 mixture of phenol and chlorobenzene at a concentration of 0.25 g/dl.
15. The adhesive composition of claim 13 wherein said acid component (1) is derived from 3,3'-sodioiminodisulfonyldibenzoic acid.
16. The adhesive composition of claim 13 wherein said acid component (2) is derived from succinic acid.
17. The adhesive composition of claim 13 wherein said component (4) is derived from 1,8-octylenebis-(carbonylimino-4-benzoic acid).
18. The adhesive composition of claim 13 wherein said diol component consists essentially of:
(1) at least 50 mole percent of units derived from at least one diol having the formula

wherein p is 1; and
(2) 0 to 50 mole percent of units derived from at least one diol having the formula HO—R'—OH wherein R' is

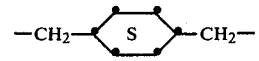

19. The adhesive composition of claim 13 wherein said diol component consists essentially of 100 mole percent of units derived from at least one diol having the formula:

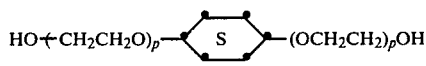

wherein p is an integer from 1 to 4.
20. The adhesive composition of claim 13 wherein said diol component consists essentially of 100 mole percent of 1,4-bis(2-hydroxyethoxy)cyclohexane.
21. An adhesive composition comprising a water-dispersible polyester having a glass transition temperature within the range of from about 25° C. to about 50° C. and an inherent viscosity within the range of about 0.1 to 1.0 at 25° C. in a 1:1 mixture of phenol and chlorobenzene at a concentration of 0.25 g/dl, the polyester comprising
A. an acid component comprising:
(1) from about 8 to about 16 mole percent of units derived from 3,3'-sodioiminodisulfonyldibenzoic acid;
(2) from about 40 to about 70 mole percent of units derived from succinic acid;
(3) from about 5 to about 20 mole percent of units derived from 3,3'-(1,4-phenylene)bisacrylic acid; and
(4) from about 5 to about 25 mole percent of units derived from 1,8-octylenebis(carbonylimino-4-benzoic acid); and
B. a diol component consisting essentially of 100 mole percent of 1,4-bis(2-hydroxyethoxy)cyclohexane.

* * * * *